(12) United States Patent
Li et al.

(10) Patent No.: US 9,319,070 B2
(45) Date of Patent: Apr. 19, 2016

(54) METHOD AND DEVICE FOR DECODING POLAR CODES

(71) Applicant: Huawei Technologies Co., Ltd., Shenzhen, Guangdong (CN)

(72) Inventors: Bin Li, Shenzhen (CN); Hui Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 14/510,609

(22) Filed: Oct. 9, 2014

(65) Prior Publication Data

US 2015/0026543 A1     Jan. 22, 2015

Related U.S. Application Data

(63) Continuation of application No. PCT/CN2012/087283, filed on Dec. 24, 2012.

(30) Foreign Application Priority Data

Apr. 11, 2012 (CN) .......................... 2012 1 0104938

(51) Int. Cl.
  *H04L 1/00* (2006.01)
  *H03M 13/13* (2006.01)
  *H04L 9/08* (2006.01)
  *H03M 13/45* (2006.01)

(52) U.S. Cl.
  CPC ............ *H03M 13/134* (2013.01); *H03M 13/13* (2013.01); *H03M 13/45* (2013.01); *H04L 1/0057* (2013.01); *H04L 9/0858* (2013.01)

(58) Field of Classification Search
  None
  See application file for complete search history.

(56) References Cited

U.S. PATENT DOCUMENTS

| 6,606,725 | B1 | 8/2003 | Wang et al. |
| 7,191,096 | B1* | 3/2007 | Gross ............... G06F 11/008 702/179 |
| 7,383,484 | B2 | 6/2008 | Yeh et al. |
| 8,363,744 | B2* | 1/2013 | Agee ............... H04B 7/0413 375/267 |
| 8,451,929 | B2* | 5/2013 | Agee ............... H04B 7/0413 375/267 |

(Continued)

FOREIGN PATENT DOCUMENTS

CN     1366739 A     8/2002
CN     101395669 A    3/2009

OTHER PUBLICATIONS

Pedarsani, R., Master Project Polar Codes: Construction and Performance Analysis, Jun. 2011, Information Theory Labortory, Pages All.*

(Continued)

*Primary Examiner* — M. Mujtaba K Chaudry

(57) ABSTRACT

Embodiments of the present invention provide a method and a device for decoding Polar codes. A reliable subset is extracted from an information bit set of the Polar codes, where reliability of information bits in the reliable subset is higher than reliability of other information bits. The method includes: obtaining a probability value or an LLR of a current decoding bit of the Polar codes; when the current decoding bit belongs to the reliable subset, performing judgment according to the probability value or the LLR of the current decoding bit to determine a decoding value of the current decoding bit, keeping the number of decoding paths of the Polar codes unchanged, and modifying probability values of all the decoding paths by using the probability value or the LLR of the current decoding bit.

10 Claims, 4 Drawing Sheets

(56) References Cited

U.S. PATENT DOCUMENTS

| | | | |
|---|---|---|---|
| 2005/0123138 A1* | 6/2005 | Abe | H04B 1/7113 380/255 |
| 2009/0297144 A1 | 12/2009 | Djordevic et al. | |
| 2010/0177615 A1 | 7/2010 | Yamamoto | |
| 2010/0257434 A1* | 10/2010 | Harrison | H03M 13/11 714/785 |
| 2012/0189324 A1* | 7/2012 | Mo | H04B 10/2569 398/202 |

OTHER PUBLICATIONS

Ido Tal, et al., "List Decoding of Polar Codes", May 31, 2012, 11 pages.

Erdal Arikan, "Channel polarization: A method for constructing capacity-achieving codes for symmetric binary-input memoryless channels", Jul. 20, 2009, 23 pages.

Wang, Jun-xuan, et al., "Polar code and its characters", Modern Electronics Technique, vol. 35, No. 1, Jan. 2012, 3 pages.

* cited by examiner

METHOD AND DEVICE FOR DECODING POLAR CODES

CROSS-REFERENCE TO RELATED APPLICATIONS

This application is a continuation of International Application No. PCT/CN2012/087283, filed on Dec. 24, 2012, which claims priority to Chinese Patent Application No. 201210104938.9, filed on Apr. 11, 2012, both of which are hereby incorporated by reference in their entireties.

TECHNICAL FIELD

Embodiments of the present invention relate to the coding and decoding field, and in particular, to a method and a device for decoding Polar codes.

BACKGROUND

In a communication system, channel coding is usually adopted to improve data transmission reliability and ensure communication quality. Polar codes are a coding mode that can achieve the Shannon capacity and have low coding and decoding complexity. The Polar codes are a type of linear block codes. A generator matrix thereof is $G_N$, and a coding process thereof is $x_1^N = u_1^N G_N$, where $G_N = B_N F^{\otimes n}$, a code length $N = 2^n$, and $n \geq 0$.

$$F = \begin{bmatrix} 1 & 0 \\ 1 & 1 \end{bmatrix},$$

and $B_N$ is a transposed matrix, such as a bit reversal matrix. $F^{\otimes n}$ is a Kronecker power of the F, and is defined as $F^{\otimes n} = F \otimes F^{\otimes(n-1)}$. The Polar codes can be expressed as (N, K, A, $u_{A^c}$) by using a coset code, and a coding process thereof is $x_1^N = u_A G_N(A) \oplus u_{A^c} G_N(A^C)$, where A is a set of an information bit index, GN. (A) is a submatrix of GN. formed by the rows with indexes in the set A, and GN. (AC) is a submatrix of GN. formed by the rows with indexes in the set $A^C$. $u_{A^c}$ represents frozen bits, the number thereof being (N−K), and are known bits. For simplicity, these frozen bits may be set to be 0.

SC (successive-cancellation) decoding may be adopted for decoding the Polar codes, and the process thereof is as follows:

Considering a type of Polar codes, and parameters thereof are (N, K, A, $u_{A^c}$).

In the SC decoding, the following conditional likelihood functions are calculated in sequence:

$$L_N^{(i)}(y_1^N, \hat{u}_1^{i-1}) \triangleq \frac{W_N^{(i)}(y_1^N, \hat{u}_1^{i-1} | 0)}{W_N^{(i)}(y_1^N, \hat{u}_1^{i-1} | 1)} \qquad (1)$$

$y_1^N$ is a received signal vector $(y_1, y_2, \ldots, y_N)$, and $u_1^{i-1}$ is a bit vector $(u_1, u_2, \ldots, u_{i-1})$. W is a transition probability, and L denotes a log-likelihood ratio.

If $i \subset A$, judgment is as follows:

$$\hat{u}_i = \begin{cases} 0, & \text{if } L_N^{(i)}(y_1^N, \hat{u}_1^{i-1}) \geq 1 \\ 1, & \text{others} \end{cases} \qquad (2)$$

If $i \subset A^C$, simply let $\hat{u}_i = u_i$ \qquad (3)

In the above formulas (2) and (3), $\hat{u}_i$ denotes a judgment value of the bit $u_i$.

Complexity of the SC decoding is $O(N \log_2 N)$. The SC decoding may achieve good performance and approach the Shannon limit in a situation that the code length N is very long. However, when N is quite short or in a moderate length, performance of the Polar codes with the SC decoding is not superior to performance of Turbo codes and LDPC (Low-density Parity-check, low-density parity-check) codes, and the decoding performance needs to be further improved.

The SC decoding is performed in order of bits, and each decoded bit is used for subsequent bit decoding after hard judgment. In this way, error propagation may exist, resulting in degradation of decoding performance. List (list) decoding maintains multiple candidate paths, and can achieve decoding performance approaching the maximum likelihood. SC-List decoding is obtained by combining the SC decoding and the List decoding.

Complexity of the current SC-List decoding is $O(L \times N \times \log_2 N)$, about L times of complexity of the SC decoding, which is relatively higher. Therefore, the List decoding complexity of the Polar codes needs to be reduced.

SUMMARY

Embodiments of the present invention provide a method and a device for decoding Polar codes, capable of reducing decoding complexity of the Polar codes.

In one aspect, a method for decoding Polar codes is provided, where a reliable subset is extracted from an information bit set of the Polar codes, and reliability of any information bit contained in the reliable subset is higher than reliability of any other information bit in the information bit set. The method includes: obtaining a probability value or a log-likelihood ratio of a current decoding bit of the Polar codes; when the current decoding bit belongs to the reliable subset, performing judgment according to the probability value or the log-likelihood ratio of the current decoding bit to determine a decoding value of the current decoding bit, keeping the number of decoding paths of the Polar codes unchanged, and modifying probability values of all the decoding paths by using the probability value or the log-likelihood ratio of the current decoding bit. The probability values of the decoding paths are obtained by calculation according to the probability value or the LLR of the decoding bit of the Polar codes.

In another aspect, a decoding device is provided, where a reliable subset is extracted from an information bit set of Polar codes, and reliability of any information bit contained in the reliable subset is higher than reliability of any other information bit in the information bit set. The device includes: an obtaining unit, configured to obtain a probability value or a log-likelihood ratio of a current decoding bit of the Polar codes; and a processing unit, configured to: when the current decoding bit belongs to the reliable subset, perform judgment according to the probability value or the log-likelihood ratio of the current decoding bit to determine a decoding value of the current decoding bit, keep the number of decoding paths of the Polar codes unchanged, and modify probability values of all the decoding paths by using the probability value or the log-likelihood ratio of the current decoding bit. The probability values of the decoding paths are obtained by calculation according to the probability value or the LLR of the decoding bit of the Polar codes.

In the embodiments of the present invention, the reliable subset is determined from the information bit set, and the information bits in the reliable subset are judged without splitting the decoding path, thereby reducing overall decoding complexity.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Embodiments of the present invention are applicable to various communication systems, and therefore, the description below is not limited to a specific communication system, for example, Global System of Mobile communication (Global System of Mobile communication, abbreviated as "GSM") system, Code Division Multiple Access (Code Division Multiple Access, abbreviated as "CDMA") system, Wideband Code Division Multiple Access (Wideband Code Division Multiple Access, abbreviated as "WCDMA") system, General Packet Radio Service (General Packet Radio Service, abbreviated as "GPRS"), Long Term Evolution (Long Term Evolution, abbreviated as "LTE") system, LTE Frequency Division Duplex (Frequency Division Duplex, abbreviated as "FDD") system, LTE Time Division Duplex (Time Division Duplex, abbreviated as "TDD"), Universal Mobile Telecommunication System (Universal Mobile Telecommunication System, abbreviated as "UMTS") and the like. Information or data which is coded by using conventional Turbo codes or LDPC codes in a base station or terminal of the above systems can be coded by using the Polar codes in the embodiments of the present invention.

A process of SC-List decoding of the Polar codes is simply described as follows:

Path splitting: each time when $\hat{u}_i$ is an information bit, a current decoding path is split into two paths: one path is $\hat{u}_i=0$, and the other one is $\hat{u}_i=1$. When the total number of paths grows beyond a predefined threshold L, the least reliable path is discarded, and only the L most reliable paths (called survived paths) are kept; and probability values on all paths are updated. L is a positive integer, and may be called the number of survived paths.

Non-path splitting: if $\hat{u}_i$ is a frozen bit, all the decoding paths are not split, let $\hat{u}_i=u_i$, the number of paths is kept unchanged, and the probability values of all paths are updated.

Figure 1:
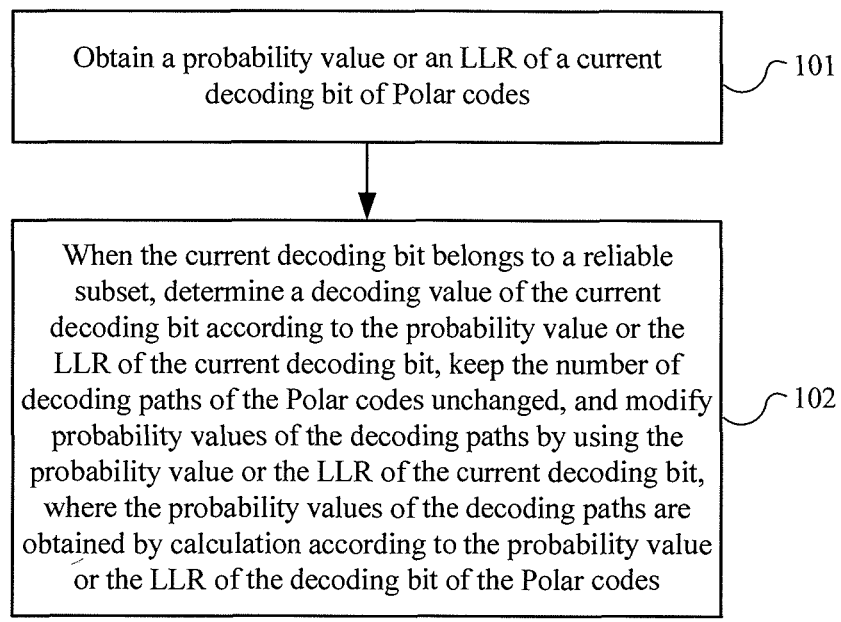
FIG. 1 is a flowchart of a method for decoding Polar codes according to an embodiment of the present invention.

FIG. 1 is a flowchart of a method for decoding Polar codes according to an embodiment of the present invention. The method illustrated in FIG. 1 is executed by a decoding end. All uncoded bits of the Polar codes include an information bit set and a frozen bit set. The information bit set consists of information bits, and the frozen bit set consists of frozen bits, and bit capacities of the information bits are higher than bit capacities of the frozen bits. A reliable subset is extracted from the information bit set, where reliability of any information bit contained in the reliable subset is higher than reliability of any other information bit in the information bit set.

Step 101: Obtain a probability value or a log-likelihood ratio LLR of a current decoding bit of the Polar codes.

The probability value or LLR of the current decoding bit may be obtained in a manner similar to the prior art.

Step 102: When the current decoding bit belongs to the reliable subset, perform judgment according to the probability value or the LLR of the current decoding bit to determine a decoding value of the current decoding bit, keep the number of decoding paths of the Polar codes unchanged, and modify probability values of all the decoding paths by using the probability value or the LLR of the current decoding bit. The probability values of the decoding paths are obtained by calculation according to the probability value or the LLR of the decoding bit of the Polar codes.

When the current decoding bit belongs to the reliable subset, path splitting is not performed, while judgment is performed according to the probability value or the LLR of the current decoding bit to determine the decoding value of the current decoding bit. For example, when the judgment is performed according to the probability value, a conditional likelihood function may be obtained according the probability value in the manner of the above formula (1), and whether $\hat{u}_i=0$ or $\hat{u}_i=1$ is judged according to the conditional likelihood function in the manner of the above formula (2). Or, when the judgment is performed according to the LLR, whether $\hat{u}_i=0$ or $\hat{u}_i=1$ is judged according to a polarity (plus or minus) of the LLR obtained by calculation.

In addition, the current probability value of the decoding path may be multiplied by the probability value of the current decoding bit, to obtain a modified probability value of the decoding path. A solution of using the log-likelihood ratio of the current decoding bit to modify the probability value is equivalent to using the probability value of the current decoding bit, and the log-likelihood ratio may be considered as a probability value in a Log domain.

In this way, according to the embodiment of the present invention, the reliable subset is determined from the information bit set, and the information bits in the reliable subset are judged without splitting the decoding path, thereby reducing overall decoding complexity.

In addition, information bits with high reliability are processed in a manner of judgment without splitting a path, which does not affect the overall decoding performance much.

Optionally, in another embodiment, when the current decoding bit belongs to the information bit set but does not belong to the reliable subset, path splitting is performed for the current decoding path, and probability values of all the decoding paths are modified by using the probability value or the LLR of the current decoding bit. The path is split to the path $\hat{u}_i=0$ and the path $\hat{u}_i=1$.

Optionally, in another embodiment, when the current decoding bit belongs to the frozen bit set, the decoding value of the current decoding bit is determined according to a known bit value of the frozen bit, the number of paths is kept unchanged, and probability values of all the decoding paths are modified. The bit value of the frozen bit is generally known, such as 0.

Optionally, in an embodiment, when the number of decoding paths of the Polar codes grows beyond a threshold value, one or more decoding paths with smallest probability values are discarded. For example, for the predefined threshold L (L is a positive integer) for the number of survived paths, when the total number of paths grows beyond the predefined threshold L, the least reliable path is discarded, and only the L most reliable paths are kept. In this way, overall decoding complexity may be controlled.

Optionally, in another embodiment, the decoding end extracts the reliable subset from the information bit set of the Polar codes. The reliable subset consists of some information bits in the information bit set, and has higher reliability. For example, the reliable subset may be determined according to the bit capacities of the information bits, to enable the bit capacities of the information bits contained in the reliable subset to be higher than the bit capacities of the other information bits in the information bit set. The reliability of the information bits is higher while the bit capacities are higher.

Optionally, in another embodiment, the reliable subset may be determined according to Bhattacharyya parameter values of the information bits, to enable the Bhattacharyya parameter values of the information bits contained in the reliable subset to be smaller than the Bhattacharyya parameter values of the other information bits in the information bit set.

Given a binary discrete memoryless channel W, a capacity I(W) and a Bhattacharyya parameter Z(W) are defined as follows:

$$I(W) \triangleq \sum_{y \in y} \sum_{x \in \chi} \frac{1}{2} W(y|x) \log \frac{W(y|x)}{\frac{1}{2}W(y|0) + \frac{1}{2}W(y|1)} \quad (4)$$

$$Z(W) \triangleq \sum_{y \in y} \sqrt{W(y|0)W(y|1)} \quad (5)$$

The Bhattacharyya parameter is related to an upper bound of a frame error rate of maximum likelihood decoding. The reliability of the information bits is higher while the Bhattacharyya parameter values are smaller.

Optionally, in another embodiment, the reliable subset may be determined according to error patterns obtained through Monte Carlo simulation, to enable an error number of the information bits contained in the reliable subset to be less than the error number of the other information bits in the information bit set. The reliability of the information bits is higher while the error number is less.

The manners of determining the reliable subset in this embodiment of the present invention are not limited to the abovementioned examples, for example, the reliable subset may be determined by combining the above manners or in other manners. All these variations fall into the scope of the embodiment of the present invention.

Figure 2:
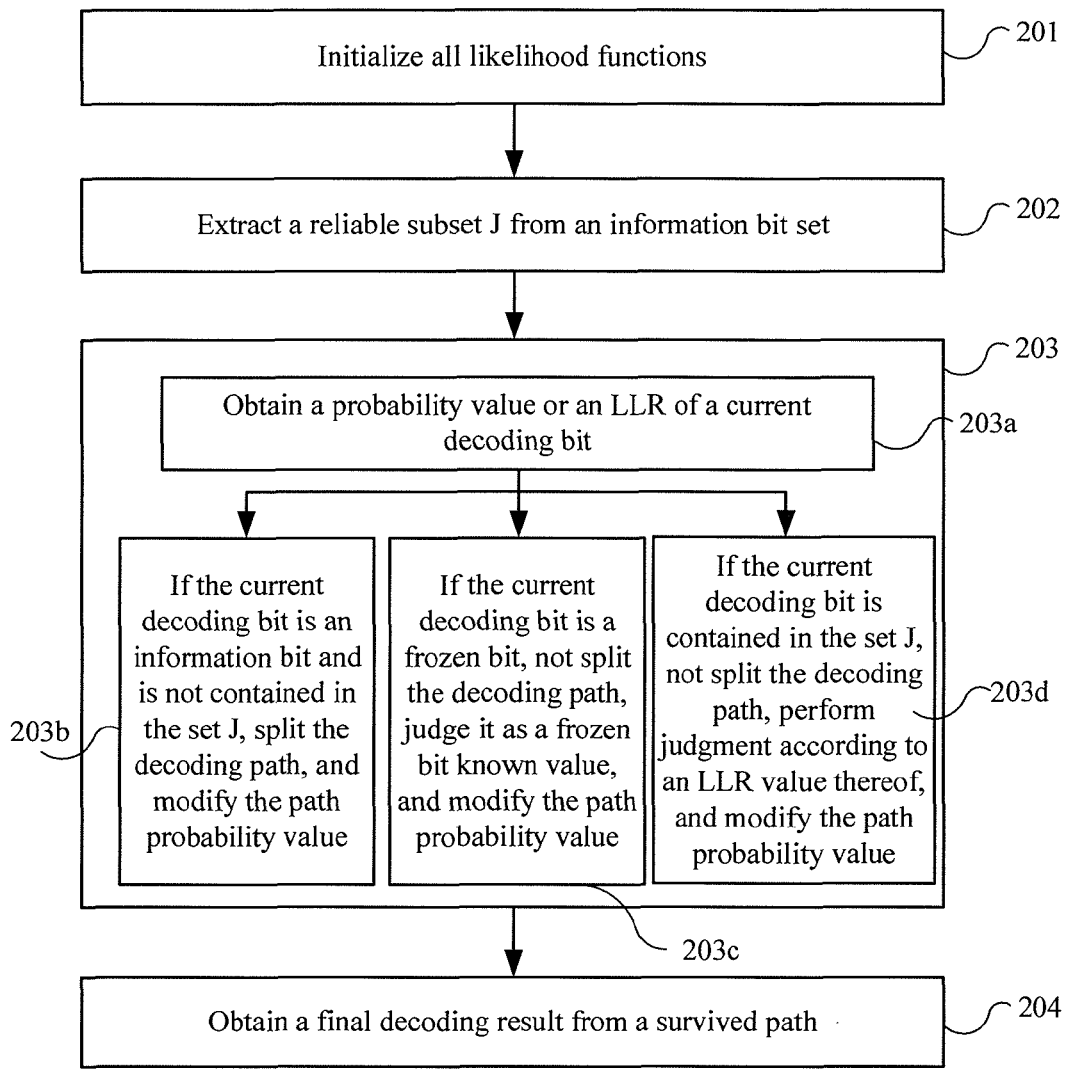
FIG. 2 is a schematic flowchart of a process of decoding Polar codes according to another embodiment of the present invention.

FIG. 2 is a schematic flowchart of a process of decoding Polar codes according to another embodiment of the present invention. The decoding process illustrated in FIG. 2 is a specific example of the method illustrated in FIG. 1.

Step 201: Initialize all likelihood functions $$L_1^{(1)}(y_i) = W(y_i|0)/W(y_i|1),$$

where y is a received signal, W is a transition probability, and L denotes a log-likelihood ratio.

Step 202: Extract a reliable subset J from an information bit set. The subset J is a set containing M bits having highest reliability (such as bit capacities).

Bit capacities of coding bits of the Polar codes are different. For a code length N, K bits having highest bit capacities are usually selected as information bits, and the remaining (N−K) bits having lowest bit capacities are as frozen (frozen) bits, and usually, the frozen bits are set to be 0. N and K are positive integers, and usually, N>K.

If J is a set containing M bits having highest bit capacities, it is required that M<K. That is, the M bits in the set J are bits having highest reliability among the information bits.

As shown in FIG. 2, step 202 is performed after step 201, but the embodiment of the present invention is not limited thereto. Step 202 may be performed before step 201, or be performed in parallel with step 201.

Step 203: Decode the Polar codes in order of bits to obtain a survived path. In the SC-List decoding process of the Polar codes, the decoding is generally performed in bit-serial order, starting from the first bit, which may be 0 or 1, the second bit may also be 0 or 1. In this way, a tree structure may be formed from the first Bit to a current decoded bit. A path is formed from a root node to a leaf node of the tree. The survived path means a remaining path after filtering in the decoding process, and actually represents a possible result of the decoding.

Step 203 may be performed according to the method illustrated in FIG. 1. A probability value or an LLR of a current decoding bit is obtained firstly (203a). An example of calculating and modifying a conditional likelihood function value LLR corresponding to the current decoding bit is taken:

$$L_N^{(i)}(y_1^N, \hat{u}_1^{i-1}) \triangleq \frac{W_N^{(i)}(y_1^N, \hat{u}_1^{i-1}|0)}{W_N^{(i)}(y_1^N, \hat{u}_1^{i-1}|1)}$$

$y_1^N$ is a received signal vector $(y_1, y_2, \ldots, y_N)$, and $u_1^{i-1}$ is a bit vector $(u_1, u_2, \ldots, u_{i-1})$.

Then, treatments are performed respectively according to the set to which the current decoding bit belongs. Specifically, one of the treatments 203b-203d may be performed according to the set to which the current decoding bit belongs.

1) (Path splitting 203b): for each current decoding bit, if the current decoding bit is an information bit and is not contained in the set J, a current decoding path is split into two paths: a path $\hat{u}_i=0$ and a path $\hat{u}_i=1$; when the total number of paths grows beyond a predefined threshold L, the least reliable path is discarded, and only the L most reliable paths are kept; and probability values on all paths are modified;

2) (Non-path splitting 203c): for each current decoding bit, if the current decoding bit is a frozen bit, all the decoding paths are not split, let $\hat{u}_i \leq u_i$, the number of paths is kept unchanged, and the probability values related to all paths are modified; and 3) (Non-path splitting 203d): for each current decoding bit, if the current decoding bit is an information bit and is contained in the set J, all the decoding paths are not split, $\hat{u}_i$ is judged according to the LLR value thereof, the number of paths is kept unchanged, and the probability values of all paths are modified.

Step 204: Obtain a final decoding result from the survived path. The judgment treatment in step 204 may be similar to the corresponding treatment of the SC-List decoding.

For example, the survived path having the largest probability value among the L survived paths may be selected as the final decoding result.

Optionally, in another embodiment, if the Polar codes are cascaded with CRC (Cyclic Redundancy Check, cyclic redundancy check), whether a path among the L survived paths passes the CRC check may be determined firstly. If one or more survived paths are determined to pass the CRC check, the survived path having the largest probability value among the one or more survived paths is output as the decoding result. Or, if none of the L survived paths pass the CRC check, the survived path having the largest probability value among the L survived paths is selected as the final decoding result.

In this way, according to the embodiment of the present invention, the reliable subset is determined from the information bit set, and the information bits in the reliable subset are judged without splitting the decoding path, thereby reducing overall decoding complexity. In addition, information bits with high reliability are processed in a manner of judgment, which does not affect the overall decoding performance much.

Specifically, in the decoding process in the embodiment of the present invention, M information bits in total are not path-split and are judged directly, which is similar to that of the frozen bits. Therefore, the overall decoding complexity may be reduced by about M/K. For example, assuming N=2048, K=1024, and M=512, the overall decoding complexity may be reduced by about M/K=50%. Simulation is performed in this situation, and under the conditions of a code rate being ½ and the number L of survived paths being 32, decoding performance in this embodiment of the present invention is comparable to performance of conventional List decoding.

Figure 3:
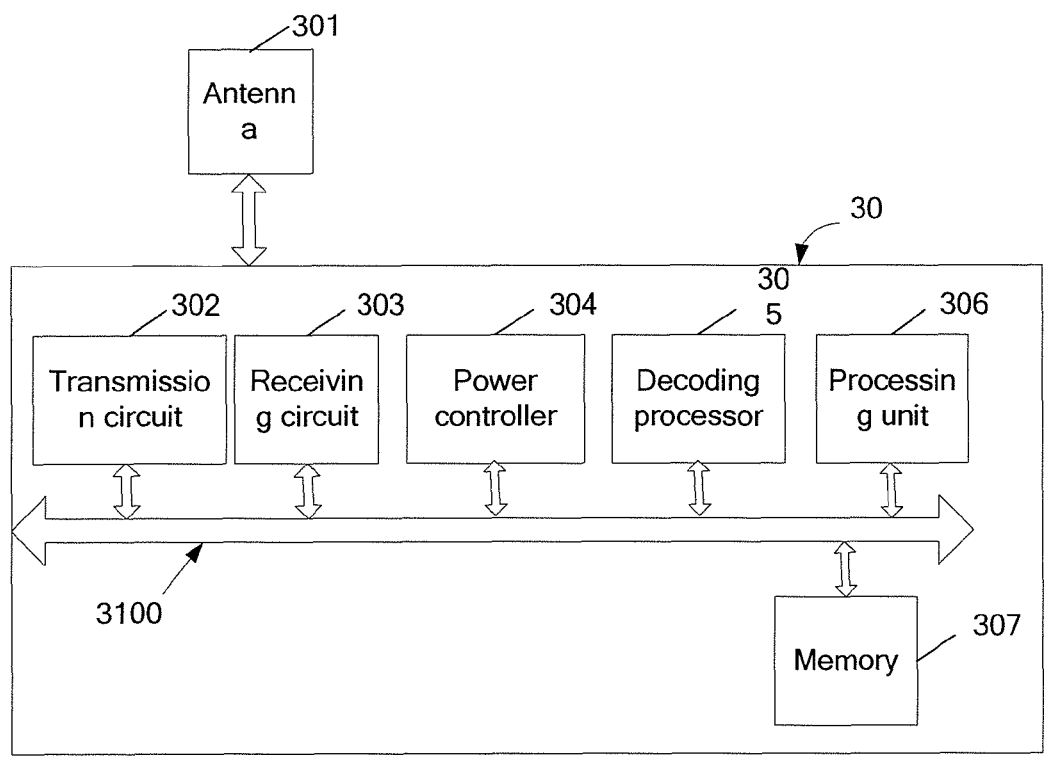
FIG. 3 shows an embodiment of a user equipment.

The present invention further provides a device embodiment for implementing the steps and methods in the above method embodiments. This embodiment of the present invention is applicable to a base station or terminal of any type of communication system. FIG. 3 shows an embodiment of a user equipment, and in this embodiment, an user equipment 30 includes a transmission circuit 302, a receiving circuit 303, a power controller 304, a decoding processor 305, a processing unit 306, a memory 307 and an antenna 301. The processing unit 306 controls operations of the equipment 30, and the processing unit 306 is further called CPU (Central Processing Unit, central processing unit). The memory 307 may include a read-only memory and a random access memory, and provide instructions and data to the processing unit 306. A part of the memory 307 may further include a non-volatile random access memory (NVRAM). In a specific application, the equipment 30 may be embedded in or be a wireless communication device like a mobile phone, or may include a carrier containing the transmission circuit 302 and the receiving circuit 303, to enable data transmission and reception between the equipment 30 and a remote location. The transmission circuit 302 and the receiving circuit 303 may be coupled to the antenna 301. Components of the equipment 30 are coupled together via a bus system 3100, where the bus system 3100 includes a power bus, a control bus, and a state signal bus in addition to a data bus. However, for clear description, all kinds of buses in the figure are marked as the bus system 3100. The equipment 30 may further include the processing unit 306 for processing signals, and additionally, include the power controller 304 and the decoding processor 305.

The methods disclosed in the above embodiments of the present invention may be applied to the decoding processor 305, or be implemented by the decoding processor 305. The decoding processor 305 may be a type of integrated circuit chips and have a signal processing capability. In the implementation process, steps of the above methods may be performed by an integrated logic circuit of hardware of the decoding processor 305 or by instructions in a software manner. The instructions may pass through the processor 306 to coordinate implementation and control. Used for executing the methods disclosed in the embodiments of the present invention, the above decoding processor may be a general processor, a digital signal processor (DSP), an application-specific integrated circuit (ASIC), a field programmable gate array (FPGA) or other programmable logic device, discrete gate or transistor logic device, discrete hardware component, and may implement or perform the methods, steps, and logic block diagrams disclosed in the embodiments of the present invention. The general processor may be a microprocessor, or the processor may also be any regular processor or decoder. The steps of the methods disclosed in the embodiments of the present invention may be directly embodied as being performed by a hardware decoding processor, or being performed by a combination of hardware and software modules in the decoding processor. The software module may be arranged in a random memory, a flash memory, a read-only memory, a programmable read-only memory, an electrically erasable programmable memory, a register, or a storage medium which is mature in this field. The storage medium is arranged in the memory 307, and the decoding processor reads information in the memory 307, and fulfills the steps of the above methods by combining with the hardware thereof.

Figure 4:
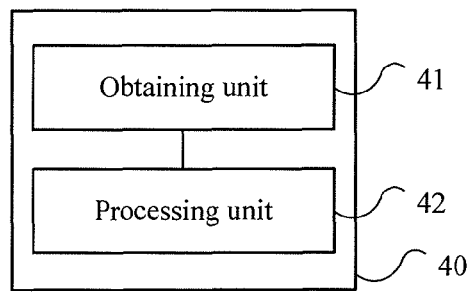
FIG. 4 is a block diagram of a device for decoding Polar codes according to an embodiment of the present invention.

FIG. 4 is a block diagram of a device for decoding Polar codes according to an embodiment of the present invention. A decoding device 40 illustrated in FIG. 4 may be a type of decoder of any suitable entity, and may be used for decoding Polar codes. All uncoded bits of the Polar codes include an information bit set and a frozen bit set, where the information bit set consists of information bits, and the frozen bit set consists of frozen bits, and bit capacities of the information bits are higher than bit capacities of the frozen bits. A reliable subset is extracted from the information bit set, where reliability of any information bit contained in the reliable subset is higher than reliability of any other information bit in the information bit set.

As shown in FIG. 4, the decoding device 40 includes an obtaining unit 41 and a processing unit 42.

The obtaining unit 41 obtains a probability value or a log-likelihood ratio of a current decoding bit of the Polar codes. The processing unit 42, when the current decoding bit belongs to the reliable subset, performs judgment according to the probability value or the log-likelihood ratio of the current decoding bit to determine a decoding value of the current decoding bit, keep the number of decoding paths of the Polar codes unchanged, and modify probability values of all the decoding paths by using the probability value or the log-likelihood ratio of the current decoding bit. The probability values of the decoding paths are obtained by calculation according to the probability value or the log-likelihood ratio of the decoding bit of the Polar codes.

In the embodiment of the present invention, the reliable subset is determined from the information bit set, and the information bits in the reliable subset are judged without splitting the decoding path, thereby reducing overall decoding complexity.

In addition, information bits with high reliability are processed in a manner of judgment without splitting a path, which does not affect the overall decoding performance much.

The decoding device 40 illustrated in FIG. 4 may execute each step of the method illustrated in FIG. 1 or FIG. 2, and in order to avoid repetition, details will not be described again. For example, the decoding device 40 may be arranged in the decoding processor 305 illustrated in FIG. 3, or be the decoding processor 305. Or, if the decoding device 40 includes a software module, the software module may be arranged in the memory 307.

Optionally, in another embodiment, the processing unit 42 is further configured to: when the current decoding bit belongs to the information bit set but does not belong to the reliable subset, perform path splitting for the current decoding path, and modify probability values of all the decoding paths by using the probability value or the log-likelihood ratio of the current decoding bit.

Optionally, in another embodiment, the processing unit 42 is further configured to: when the current decoding bit belongs to the frozen bit set, determine the decoding value of the current decoding bit according to a known bit value of the frozen bit, keep the number of paths unchanged, and modify probability values of all the decoding paths.

Optionally, in another embodiment, the processing unit 42 is further configured to: when the number of paths grows beyond a threshold value, discard one or more decoding paths with smallest probability values. For example, for the predefined threshold L (L is a positive integer) for the number of survived paths, when the total number of paths grows beyond the predefined threshold L, the least reliable path is discarded, and only the L most reliable paths are kept. In this way, overall decoding complexity may be controlled.

Figure 5:
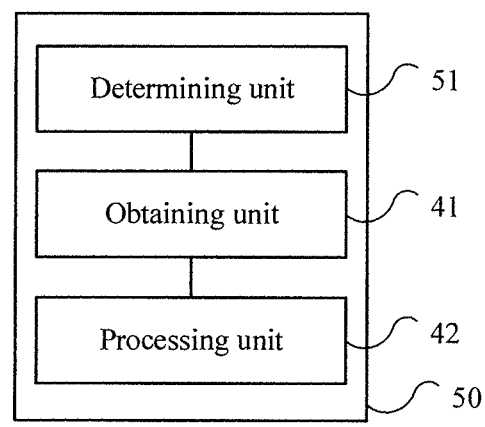
FIG. 5 is a block diagram of a decoding device according to another embodiment of the present invention.

FIG. 5 is a block diagram of a decoding device according to another embodiment of the present invention. A decoding device 50 illustrated in FIG. 5 is a specific embodiment of the decoding device 40 illustrated in FIG. 4, and includes all parts of the decoding device 40. In addition, the decoding device 50 further includes a determining unit 51, configured to determine a reliable subset of an information bit set.

Optionally, in an embodiment, the determining unit 51 may determine the reliable subset according to the bit capacities of the information bits, to enable the bit capacities of the information bits contained in the reliable subset to be higher than the bit capacities of the other information bits in the information bit set. The reliability of the information bits is higher while the bit capacities are higher.

Optionally, in an embodiment, the determining unit 51 may determine the reliable subset according to Bhattacharyya parameter values of the information bits, to enable the Bhattacharyya parameter values of the information bits contained in the reliable subset to be smaller than the Bhattacharyya parameter values of the other information bits in the information bit set. The reliability of the information bits is higher while the Bhattacharyya parameter values are smaller.

Optionally, in another embodiment, the determining unit 51 may determine the reliable subset according to error patterns obtained through Monte Carlo simulation, to enable an error number of the information bits contained in the reliable subset to be less than the error number of the other information bits in the information bit set. The reliability of the information bits is higher while the error number is less.

The manners of determining the reliable subset in this embodiment of the present invention are not limited to the abovementioned examples, for example, the reliable subset may be determined by combining the above manners or in other manners. All these variations fall into the scope of the embodiment of the present invention.

In the embodiment of the present invention, the reliable subset is determined from the information bit set, and the information bits in the reliable subset are judged without splitting the decoding path, thereby reducing overall decoding complexity. In addition, information bits with high reliability are processed in a manner of judgment, which does not affect the overall decoding performance much.

The decoding device 50 illustrated in FIG. 5 may execute each step of the method illustrated in FIG. 1 or FIG. 2, and in order to avoid repetition, details will not be described again. For example, the decoding device 50 may be arranged in the decoding processor 305 illustrated in FIG. 3, or be the decoding processor 305. Or, if the decoding device 50 includes a software module, the software module may be arranged in the memory 307.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be arranged in one position, or may be distributed on a plurality of network units. A part or all of the units may be selected according to the actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to perform all or a part of the steps of the method described in the embodiment of the present invention. The storage medium includes: any medium that can store program code, such as a USB flash disk; a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for decoding Polar codes, wherein a reliable subset is extracted from an information bit set of the Polar codes, reliability of any information bit contained in the reliable subset being higher than reliability of any other information bit in the information bit set, the method comprising:
    obtaining a probability value or a log-likelihood ratio of a current decoding bit of the Polar codes;
    when the current decoding bit belongs to the reliable subset, determining a decoding value of the current decoding bit according to the probability value or the log-likelihood ratio of the current decoding bit, keeping the number of decoding paths of the Polar codes unchanged, and modifying probability values of the decoding paths by using the probability value or the log-likelihood ratio of the current decoding bit, wherein the probability values of the decoding paths are obtained by calculation according to the probability value or the log-likelihood ratio of the decoding bit of the Polar codes.

2. The method according to claim 1, further comprising:
    when the current decoding bit belongs to the information bit set but does not belong to the reliable subset, performing path splitting for the current decoding path, and modifying probability values of all the decoding paths by using the probability value or the log-likelihood ratio of the current decoding bit.

3. The method according to claim 1, further comprising:
    when the current decoding bit belongs to a frozen bit set, determining the decoding value of the current decoding bit according to a bit value of a frozen bit, keeping the number of paths unchanged, and modifying probability values of all the decoding paths.

4. The method according to claim 2, further comprising:
    when the number of decoding paths of the Polar codes grows beyond a threshold value, discarding a decoding path with a smallest probability value or log-likelihood ratio.

5. The method according to claim 1, wherein the extracting a reliable subset from an information bit set of the Polar codes comprises:
    determining the reliable subset according to bit capacities of information bits, to enable the bit capacities of the information bits contained in the reliable subset to be higher than the bit capacities of the other information bits in the information bit set; or
    determining the reliable subset according to Bhattacharyya parameter values of the information bits, to enable the Bhattacharyya parameter values of the information bits contained in the reliable subset to be smaller than the Bhattacharyya parameter values of the other information bits in the information bit set; or
    determining the reliable subset according to error patterns obtained through Monte Carlo simulation, to enable an error number of the information bits contained in the reliable subset to be less than the error number of the other information bits in the information bit set.

6. A device for decoding Polar codes, wherein a reliable subset is extracted from an information bit set of the Polar codes, reliability of any information bit contained in the reliable subset being higher than reliability of any other information bit in the information bit set, the device comprising:
    an obtaining unit, configured to obtain a probability value or a log-likelihood ratio of a current decoding bit of the Polar codes; and
    a processing unit, configured to: when the current decoding bit belongs to the reliable subset, determine a decoding value of the current decoding bit according to the probability value or the log-likelihood ratio of the current decoding bit, keep the number of decoding paths of the Polar codes unchanged, and modify probability values of all the decoding paths by using the probability value or the log-likelihood ratio of the current decoding bit, wherein the probability values of the decoding paths are obtained by calculation according to the probability value or the log-likelihood ratio of the decoding bit of the Polar codes.

7. The device according to claim 6, wherein the processing unit is further configured to: when the current decoding bit belongs to the information bit set but does not belong to the reliable subset, perform path splitting for the current decoding path, and modify probability values of all the decoding paths by using the probability value or the log-likelihood ratio of the current decoding bit.

8. The device according to claim 6, wherein the processing unit is further configured to: when the current decoding bit belongs to a frozen bit set, determine the decoding value of the current decoding bit according to a bit value of a frozen bit, keep the number of paths unchanged, and modify probability values of all the decoding paths.

9. The device according to claim 6, wherein the processing unit is further configured to: when the number of decoding paths of the Polar codes grows beyond a threshold value, discard one or more decoding paths with smallest probability values.

10. The device according to claim 6, further comprising a determining unit configured to: determine the reliable subset according to bit capacities of information bits, to enable the bit capacities of the information bits contained in the reliable subset to be higher than the bit capacities of the other information bits in the information bit set; or determine the reliable subset according to Bhattacharyya parameter values of the information bits, to enable the Bhattacharyya parameter values of the information bits contained in the reliable subset to be smaller than the Bhattacharyya parameter values of the other information bits in the information bit set; or determine the reliable subset according to error patterns obtained through Monte Carlo simulation, to enable an error number of the information bits contained in the reliable subset to be less than the error number of the other information bits in the information bit set.

* * * * *